US009133625B2

(12) United States Patent
Mingyong et al.

(10) Patent No.: US 9,133,625 B2
(45) Date of Patent: Sep. 15, 2015

(54) SHEATHING ELEMENT FOR COVERING PREEXISTING PHYSICAL STRUCTURES

(71) Applicant: Zhejiang Huaxiajie Macromolecule Building Material Co., Ltd., Huzhou, Zhejiang (CN)

(72) Inventors: Tong Mingyong, Zhejiang (CN); Fuzhong Liu, Alexandria (CA)

(73) Assignee: MOULURE ALEXANDRIA MOULDING, Alexandria (CA)

( * ) Notice: Subject to any disclaimer, the term of this patent is extended or adjusted under 35 U.S.C. 154(b) by 0 days.

(21) Appl. No.: 14/132,615

(22) Filed: Dec. 18, 2013

(65) Prior Publication Data

US 2015/0167311 A1 Jun. 18, 2015

(51) Int. Cl.
*E04F 13/07* (2006.01)
*E04H 12/22* (2006.01)
*E01F 15/14* (2006.01)
*F16B 5/00* (2006.01)

(52) U.S. Cl.
CPC .............. *E04F 13/07* (2013.01); *E01F 15/141* (2013.01); *E04H 12/2292* (2013.01); *F16B 5/0016* (2013.01); *E04F 2201/0115* (2013.01); *E04F 2201/041* (2013.01)

(58) Field of Classification Search
CPC .................. E04F 2201/0115; E04F 2201/041; E04F 13/07; E01F 15/141; E01F 15/0469; E04B 1/66; F16B 5/0016; E04H 12/2292
USPC .............. 52/590.1, 590.3, 592.4, 591.1, 170, 52/169.14, 834, 835; 403/289
See application file for complete search history.

(56) References Cited

U.S. PATENT DOCUMENTS

| 2,947,040 | A | * | 8/1960 | Schultz ........................ 52/592.4 |
| 3,562,992 | A | * | 2/1971 | Kinsey ......................... 52/588.1 |
| 3,590,547 | A | * | 7/1971 | Molyneux et al. ............. 52/834 |
| 3,815,311 | A | * | 6/1974 | Nisula et al. ................... 52/579 |
| 4,019,301 | A | * | 4/1977 | Fox ............................... 52/834 |
| 4,485,597 | A | * | 12/1984 | Worrallo ........................ 52/479 |
| 4,765,674 | A | * | 8/1988 | Svensson .................. 296/97.13 |
| 5,006,386 | A | * | 4/1991 | Menichini ...................... 428/58 |
| 5,247,773 | A | * | 9/1993 | Weir ............................. 52/592.3 |
| 5,282,832 | A | * | 2/1994 | Toso et al. .................... 606/232 |
| 5,295,341 | A | * | 3/1994 | Kajiwara ..................... 52/586.2 |
| 5,956,920 | A | * | 9/1999 | Davis ............................. 52/844 |
| 6,036,398 | A | * | 3/2000 | Theodorou ................. 403/292 |
| 6,122,879 | A | * | 9/2000 | Montes ........................ 52/592.1 |
| 6,242,070 | B1 | * | 6/2001 | Gillispie et al. ............... 428/99 |
| 6,295,783 | B1 | * | 10/2001 | Davis ............................. 52/834 |

(Continued)

FOREIGN PATENT DOCUMENTS

| CA | 2238453 | * | 12/2001 | ............. E04F 13/18 |
| WO | WO 2005/075745 | A1 * | 8/2005 | ............. E01F 15/14 |

*Primary Examiner* — Brent W Herring
(74) *Attorney, Agent, or Firm* — Harness, Dickey & Pierce, P.L.C.

(57) ABSTRACT

A sheathing element for covering a preexisting physical structure comprising a first planar portion disposed at an angle to a second planar portion, a longitudinally extending slot located centrally along a longitudinally extending edge of the first planar portion or the second planar portion, and a longitudinally extending tongue located centrally along a longitudinally extending edge of the first planar portion or the second planar portion such that the longitudinally extending tongue of a first sheathing element fits within the longitudinally extending slot of a second sheathing element in a grippable yet releasable manner.

11 Claims, 1 Drawing Sheet

(56) References Cited

U.S. PATENT DOCUMENTS

| | | | |
|---|---|---|---|
| 6,729,091 B1* | 5/2004 | Martensson | 52/391 |
| 7,654,055 B2* | 2/2010 | Ricker | 52/592.1 |
| 7,739,848 B2* | 6/2010 | Trout | 52/581 |
| 8,074,418 B2* | 12/2011 | Thiagarajan et al. | 52/590.1 |
| 8,234,834 B2* | 8/2012 | Martensson et al. | 52/747.1 |
| 8,281,549 B2* | 10/2012 | Du | 52/747.1 |
| 8,443,576 B2* | 5/2013 | Petta | 52/835 |
| 8,769,904 B1* | 7/2014 | Brandt et al. | 52/588.1 |
| 2002/0017072 A1* | 2/2002 | Davis | 52/736.3 |
| 2005/0047853 A1* | 3/2005 | Pettitt et al. | 403/289 |
| 2010/0287858 A1* | 11/2010 | Israeli et al. | 52/220.7 |

* cited by examiner

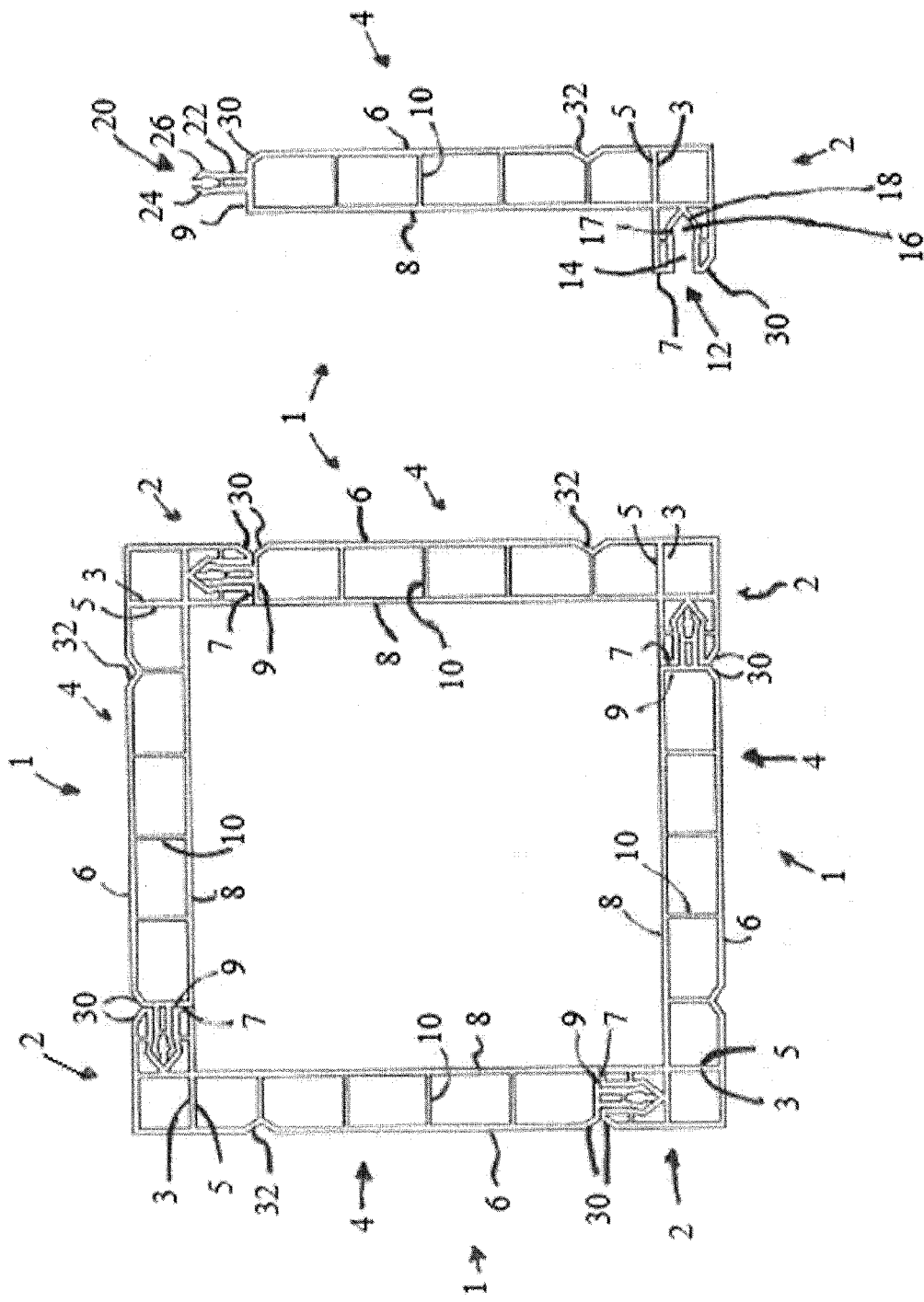

SHEATHING ELEMENT FOR COVERING PREEXISTING PHYSICAL STRUCTURES

FIELD OF THE INVENTION

The present invention relates to construction materials. More specifically, the present invention relates to a sheathing system for sheathing a preexisting physical structure in an economical, aesthetically pleasing, durable and functional manner.

BACKGROUND OF THE INVENTION

A common modern construction technique involves pouring concrete into molds which are then removed after the concrete has set. The resultant physical structure has a resultant molded concrete surface that is often not desirable from an aesthetic standpoint. Further, exposed concrete surfaces can be vulnerable to wear or discoloration when exposed to the elements or, in interior applications, physical contact with people.

Various sheathing systems exist that are designed for covering preexisting interior and exterior physical structures, such as wood posts, concrete posts or jack posts. However, many of these pre-existing systems cannot be manufactured in an economical manner that still results in a durable, modular and aesthetically pleasing final product that is easy to install.

Accordingly, there is need for a sheathing system that is easy to manufacture and install, inexpensive, durable, modular, and that looks aesthetically pleasing.

SUMMARY OF THE INVENTION

The present invention provides a sheathing system for sheathing a preexisting physical structure in an economical, aesthetically pleasing, durable and functional manner.

In at least one embodiment, the present invention provides a sheathing element for covering a preexisting physical structure, the sheathing element having a first planar portion having a first longitudinally extending edge and a second longitudinally extending ledge, a second planar portion having a first longitudinally extending edge and a second longitudinally extending edge, the first longitudinally extending edge of the second planar portion abutting the first longitudinally extending edge of the first planar portion such that an angle is disposed between the first planar portion and the second planar portion, a longitudinally extending slot located centrally along one of the second longitudinally extending edge of the first planar portion and the second longitudinally extending edge of the second planar portion, and a longitudinally extending tongue located centrally along the other of the second longitudinally extending edge of the first planar portion and the second longitudinally extending edge of the second planar portion such that the longitudinally extending tongue of a first sheathing element fits within the longitudinally extending slot of a second sheathing element in a grippable yet releasable manner.

BRIEF DESCRIPTION OF THE DRAWINGS

Embodiments of the present invention will be better understood in connection with the following Figures, in which:

FIG. 1 is a cross-sectional view of an assembly of sheathing elements in accordance with at least one embodiment of the present invention; and, FIG. 2 is a cross-sectional view of a sheathing element in accordance with at least one embodiment of the present invention.

DETAILED DESCRIPTION OF THE PREFERRED EMBODIMENTS

The present invention provides a sheathing element that can be used to quickly and securely sheath a preexisting physical structure with no additional hardware required, although it is contemplated that mechanical or chemical fasteners may be used to secure the sheathing elements in place once they are installed.

The present sheathing element can be manufactured out of any suitable known material that will be readily apparent to the skilled person, such as but not limited to steel, aluminum, MDF, fiberglass, plastic, carbon fiber, solid wood, plywood, concrete, foam, composite, OSB, PVC and any suitable mixtures thereof. It is contemplate that the present invention can be sold finished or may require finishing on-site once it has been installed.

The present sheathing element can be manufactured by any suitable known process that will be readily apparent to the skilled person, such as but not limited to material deposition, extrusion, molding, milling, investment casting, carving and combinations thereof.

It is contemplated that the present sheathing element can be manufactured of separate components suitably joined together or alternatively can be formed of a single unitary component.

The present sheathing element can be used for any suitable application as will be readily apparent to the skilled person, including but not limited to sound insulation, thermal insulation, aesthetic decoration and protection from the elements, among any other combination thereof.

The sheathing element has a first planar portion connected to a second planar portion. It is contemplated that the first planar portion is oriented at an angle to the second planar portion. It is contemplated that the angle disposed between the two planar portions can be any suitable angle for the application at hand, such as any angle between 0 and 180 degrees.

It is contemplated that the planar portions can take any suitable dimensions. In at least one embodiment it is contemplated that the planar portions extend vertically in a longitudinal manner such that they form longitudinally extending rectangular planar portions however other arrangements are also contemplated.

In some embodiments, it is contemplated that the planar portions consist of a first planar surface spaced apart from and parallel to a second planar surface. It is further contemplated that in some embodiments at least one rib adjoins the first planar surface to the second planar surface. In these embodiments it is contemplated that an airspace is effectively provided between the first planar surface and the second planar surface. This airspace can be used to house cables or conduit, and alternately could receive thermal or sound insulation.

It is contemplated that each planar portion has a first longitudinally extending edge and a second longitudinally extending edge. It is contemplated that the first longitudinal edge of the first planar portion abuts the second longitudinal edge of the first planar portion in order to define an angle between the two planar portions as discussed above. Further, it is contemplated that the second longitudinally extending edge of the planar portions can have either a longitudinally extending groove or a longitudinally extending tongue as will be discussed in further detail below.

In some embodiments, it is contemplated that the second longitudinally extending edge of the planar portion further includes at least one chamfer located along at least one of the longitudinally extending sides of the second longitudinally extending edge. It is contemplated that the chamfer can have any shape such as rounded, straight, or have multiple bevels, as the instant application may require. It is contemplated that chamfer could be oriented on an inner surface or on an outer surface of the second longitudinally extending edge of the planar portions.

In at least one embodiment the longitudinally extending slot can be located centrally along the second longitudinally extending side of the planar portions. It is contemplated that the longitudinally extending slot extends inwardly into the respective planar portions. The longitudinally extending slot can take any suitable cross sectional shape as will be readily appreciated by the skilled person.

In at least one embodiment, the longitudinally extending slot can have a longitudinally extending channel of a first width that communicates with a longitudinally extending cavity of a second width. In some embodiments, the second width will be greater than the first width. Further, it is contemplated that the longitudinally extending cavity can have any cross sectional shape including but not limited to generally circular, generally elliptical or generally polygonal as will be required by the instant application.

In at least one embodiment the longitudinally extending tongue can be located centrally along the second longitudinally extending side of the planar portions. It is contemplated that the longitudinally extending tongue projects outwardly from the respective planar portions. The longitudinally extending tongue can take any suitable cross sectional shape as will be readily appreciated by the skilled person.

In at least one embodiment, the longitudinally extending tongue can have a longitudinally extending central projecting flange that projects outwardly from the second longitudinally extending edge of the planar portions. The longitudinally extending central projecting flange has a first longitudinally extending edge that can abut and adjoin the second longitudinally extending side of the planar portions and a second longitudinally extending edge that can abut and adjoin a first and second angled flange that are directly opposed to one another. It is contemplated that the first and second angled flanges can take any suitable shape including angled or alternatively, generally arcuate. In some embodiments the longitudinally extending distal edges of the flanges may have a gap disposed therebetween and in other embodiments it is contemplated that the two flanges abut (and even possibly adjoin) one another along their respective longitudinally extending distal edges.

In embodiments where a gap is disposed between the longitudinally extending distal edges of the flanges it is contemplated that the flanges when inserted in a corresponding groove of a second sheathing element, as will be discussed in further detail below.

In this way, the longitudinally extending tongue of a first sheathing element can be received in the longitudinally extending groove of the second sheathing element such that the two sheathing elements are connected in a releasable yet grippable manner. As will be readily understood by the skilled person, in some embodiments it will be contemplated that the two sheathing elements can fit together using a force fit, interference fit or a friction fit of various degrees, as will be readily understood by the skilled person.

As will be readily understood by the skilled person, multiple sheathing elements can be sized and oriented in a wide variety of shapes and arrangements such that multiple sheathing elements can be interfitted together to form a sheathing system that can be used to quickly and securely sheath a preexisting physical structure of any shape with no additional hardware required, although it is contemplated that mechanical or chemical fasteners may be used to secure the sheathing elements in place once they are installed.

EXAMPLE

Turning to FIGS. 1 and 2, at least one embodiment of interconnecting sheathing elements in accordance with the present invention is illustrated in cross section wherein sheathing element 1 has a first planar portion 2 and a second planar portion 4. It will be readily understood that in this cross-sectional view all components extend longitudinally into and out of the Figures in the z-axis, as will be readily understood by the skilled person.

Each planar portion has a first planar surface 6 spaced apart from and oriented parallel to a second planar surface 8. First planar surface 6 is connected to second planar surface 8 by way of at least one rib 10.

Both first planar portion 2 and second planar portion 4 adjoin one another at a first edge 3, 5 such that an angle is disposed between first planar portion 2 and second planar portion 4. First planar portion 2 and a second planar portion 4 also have second edges 7, 9.

In this embodiment, second edge 7 has a centrally located groove 12 and second edge 9 has a centrally located tongue 20. Groove 12 has a channel 14 of a first width that is wider than the width of cavity 16. Cavity 16 is formed of two opposed, angled surfaces 17, 18 in order to form a polygonal cross-section.

In this embodiment, tongue 20 has a central projecting flange 22 which abuts and adjoins a first flange 24 and a second flange 26. In this embodiment, first flange 24 and second flange 26 are directly opposed and have an angled cross section. In this embodiment, the distal edges of first flange 24 and second flange 26 define a gap therebetween, such that first flange 24 and second flange 26 can inwardly flex toward one another when interfitted with a corresponding groove of a second sheathing element, as will be readily understood by the skilled person.

In this embodiment, both second edge 7 and second edge 9 have angled chamfers 30 and second planar portion 4 has a groove 32 which is angled in order to match chamfer 30 from an aesthetic perspective.

In this way, tongue 20 of a first sheathing element can be received in groove 12 of a second sheathing element such that the two sheathing elements are connected in a releasable yet grippable manner.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

We claim:

1. A sheathing element for covering a preexisting physical structure, the sheathing element comprising:
a first planar portion having a first longitudinally extending edge and a second longitudinally extending edge;
a second planar portion having a first longitudinally extending edge and a second longitudinally extending edge, the first longitudinally extending edge of the second planar portion abutting the first longitudinally extending edge of the first planar portion such that a substantially 90° angle is disposed between the first planar portion and the second planar portion;

a longitudinally extending slot located centrally along one of the second longitudinally extending edge of the first planar portion and the second longitudinally extending edge of the second planar portion; and a longitudinally extending tongue located centrally along the other of the second longitudinally extending edge of the first planar portion and the second longitudinally extending edge of the second planar portion, the longitudinally extending tongue comprising a longitudinally extending central projecting flange having a first longitudinally extending edge and a second longitudinally extending edge, the first longitudinally extending edge of the longitudinally extending central projecting flange abutting one of the second longitudinally extending edge of the first planar portion and the second longitudinally extending edge of the second planar portion, a first longitudinally extending outwardly convex flange abutting and adjoining the second longitudinally extending edge of the central projecting flange and symmetrically opposed from a second longitudinally extending outwardly convex flange abutting and adjoining the second longitudinally extending edge of the central projecting flange, the first longitudinally extending outwardly convex flange and the second longitudinally extending outwardly convex flange defining a longitudinally extending gap therebetween; and further wherein said longitudinally extending slot is defined by inwardly concave opposing surfaces that are configured to cooperate with said first and second outwardly convex flanges of said longitudinally extending tongue to enable the longitudinally extending tongue of a first sheathing element to fit within the longitudinally extending slot of a second sheathing element in a grippable yet releasable manner.

2. The sheathing element of claim 1, wherein at least one of the first planar portion and the second planar portion further comprises a first planar surface spaced apart from and parallel oriented to a second planar surface, the first planar surface connected to the second planar surface by at least one longitudinally extending rib.

3. The sheathing element of claim 1, wherein at least one of the first longitudinally extending edge of the first planar portion and the first longitudinally extending edge of the second planar further comprises a longitudinally extending chamfer located along one longitudinally extending side of the longitudinally extending edge.

4. The sheathing element of claim 1 wherein the longitudinally extending slot further comprises a longitudinally extending channel of a first width in communication with a longitudinally extending cavity of a second width, the second width being greater than the first width.

5. The sheathing element of claim 4 wherein the longitudinally extending cavity is further comprised of a first longitudinally extending angled surface directly opposed to a second longitudinally extending angled surface, the first longitudinally extending angled surface and the second longitudinally extending angled surface each having a first longitudinally extending edge, the first longitudinally extending edge of the first longitudinally extending angled surface abutting the first longitudinally extending edge of the second longitudinally extending angled surface such that an angle is disposed between said first longitudinally extending angled surface and said second longitudinally extending angled surface.

6. The sheathing element of claim 1 wherein one of said first planar portion and said second planar portion further comprises a longitudinally extending groove.

7. A sheathing element system for covering a preexisting physical structure, comprising at least a first sheathing element and second sheathing element, each of said at least first sheathing element and second sheathing element comprising:

a first planar portion having a first longitudinally extending edge and a second longitudinally extending edge;

a second planar portion having a first longitudinally extending edge and a second longitudinally extending edge, the first longitudinally extending edge of the second planar portion abutting the first longitudinally extending edge of the first planar portion such that a substantially 90° angle is disposed between the first planar portion and the second planar portion;

a longitudinally extending slot located centrally along one of the second longitudinally extending edge of the first planar portion and the second longitudinally extending edge of the second planar portion; and a longitudinally extending tongue located centrally along the other of the second longitudinally extending edge of the first planar portion and the second longitudinally extending edge of the second planar portion, the longitudinally extending tongue comprising a longitudinally extending central projecting flange having a first longitudinally extending edge and a second longitudinally extending edge, the first longitudinally extending edge of the longitudinally extending central projecting flange abutting one of the second longitudinally extending edge of the first planar portion and the second longitudinally extending edge of the second planar portion, a first longitudinally extending outwardly convex flange abutting and adjoining the second longitudinally extending edge of the central projecting flange and symmetrically opposed from a second longitudinally extending outwardly convex flange abutting and adjoining the second longitudinally extending edge of the central projecting flange, the first longitudinally extending outwardly convex flange and second longitudinally extending outwardly convex flange defining a longitudinally extending gap therebetween;

wherein said longitudinally extending slot is defined by inwardly concave opposing surfaces that are configured to cooperate with said first and second outwardly convex flanges of said longitudinally extending tongue; and further wherein the longitudinally extending tongue of the first sheathing element fits within the longitudinally extending slot of the second sheathing element in a grippable yet releasable manner to connect the first sheathing element to the second sheathing element.

8. The sheathing element system of claim 7 wherein the first and second sheathing elements are configured identically.

9. The sheathing element kit of claim 8 wherein the length of said first planar portion is substantially shorter than the length of said second planar portion in a plane normal to said substantially 90° angle.

10. A sheathing element kit for covering a preexisting physical structure, comprising four identically configured sheathing elements, each of said four sheathing elements comprising:

a first planar portion having a first longitudinally extending edge and a second longitudinally extending edge;

a second planar portion having a first longitudinally extending edge and a second longitudinally extending edge, the first longitudinally extending edge of the second planar portion abutting the first longitudinally extending edge of the first planar portion such that a substantially 90° angle is disposed between the first planar portion and the second planar portion;

a longitudinally extending slot located centrally along one of the second longitudinally extending edge of the first planar portion and the second longitudinally extending edge of the second planar portion; and a longitudinally extending tongue located centrally along the other of the second longitudinally extending edge of the first planar portion and the second longitudinally extending edge of the second planar portion, the longitudinally extending tongue comprising a longitudinally extending central projecting flange having a first longitudinally extending edge and a second longitudinally extending edge, the first longitudinally extending edge of the longitudinally extending central projecting flange abutting one of the second longitudinally extending edge of the first planar portion and the second longitudinally extending edge of the second planar portion, a first longitudinally extending outwardly convex flange abutting and adjoining the second longitudinally extending edge of the central projecting flange and symmetrically opposed from a second longitudinally extending outwardly convex flange abutting and adjoining the second longitudinally extending edge of the central projecting flange, the first longitudinally extending outwardly convex flange and second longitudinally extending outwardly convex flange defining a longitudinally extending gap therebetween;

wherein said longitudinally extending slot is defined by inwardly concave opposing surfaces that are configured to cooperate with said first and second outwardly convex flanges of said longitudinally extending longue; and further wherein the longitudinally extending tongue of a first of said four sheathing elements fits within the longitudinally extending slot of a second of said four sheathing elements in a grippable yet releasable manner to connect the first sheathing element to the second sheathing element, wherein the longitudinally extending tongue of said second sheathing element fits within the longitudinally extending slot of a third of said four sheathing elements in a grippable yet releasable manner to connect the second sheathing element to the third sheathing element, wherein the longitudinally extending tongue of said third sheathing element fits within the longitudinally extending slot of a fourth of said four sheathing elements in a grippable yet releasable manner to connect the third sheathing element to the fourth sheathing element, and wherein the longitudinally extending tongue of said fourth sheathing element fits within the longitudinally extending slot of said first sheathing element in a grippable yet releasable manner to connect the fourth sheathing element to the first sheathing element, to thereby form a rectangular-shaped enclose surrounding the preexisting physical structure.

11. The sheathing element system of claim 10 wherein the length of said first planar portion is substantially shorter than the length of said second planar portion in a plane normal to said substantially 90° angle.

\* \* \* \* \*